(12) United States Patent
Kim et al.

(10) Patent No.: US 9,709,859 B2
(45) Date of Patent: Jul. 18, 2017

(54) OPTICAL MODULATION DEVICE AND A DRIVING METHOD THEREOF

(71) Applicant: SAMSUNG DISPLAY CO., LTD., Yongin, Gyeonggi-Do (KR)

(72) Inventors: Su Jin Kim, Seoul (KR); Suk Choi, Seongnam-si (KR); Sung Hwan Hong, Suwon-si (KR); Ki Chul Shin, Seongnam-si (KR); Hyeok Jin Lee, Seongnam-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/817,995

(22) Filed: Aug. 4, 2015

(65) Prior Publication Data

US 2016/0202566 A1    Jul. 14, 2016

(30) Foreign Application Priority Data

Jan. 13, 2015  (KR) ................. 10-2015-0006146

(51) Int. Cl.
*G02F 1/1335*  (2006.01)
*G02F 1/1343*  (2006.01)
(Continued)

(52) U.S. Cl.
CPC .......... *G02F 1/134309* (2013.01); *G02F 1/29* (2013.01); *G02B 27/22* (2013.01);
(Continued)

(58) Field of Classification Search
CPC .................. G02F 2001/134381; G02B 27/22
See application file for complete search history.

(56) References Cited

U.S. PATENT DOCUMENTS 7,532,272 B2   5/2009  Woodgate et al.
8,154,799 B2   4/2012  Kim et al.
(Continued)

FOREIGN PATENT DOCUMENTS

KR   1020090004006   1/2009
KR   1020100013179   2/2010
(Continued)

OTHER PUBLICATIONS

Hyung-Ki Hong, et al., 25.3: Autostereoscopic 2D/3D Switching Display Using Electric-Field-Driven LC Lens (ELC Lens); SID 08 Digest, pp. 348-351.

*Primary Examiner* — Phu Vu
(74) *Attorney, Agent, or Firm* — F. Chau & Associates, LLC

(57) ABSTRACT

An optical modulation device includes a first plate, a second plate, and a liquid crystal layer. The first plate includes a first substrate, a lower plate electrode formed on the first substrate, a first electrode layer, and a first aligner. The first electrode layer and the first aligner are formed on the lower plate electrode. The second plate faces the first plate. The second plate includes an upper plate electrode and a second aligner. The liquid crystal layer is disposed between the first plate and the second plate. The liquid crystal layer includes a plurality of liquid crystal molecules. An alignment direction of the first aligner and an alignment direction of the second aligner are substantially parallel with each other.

19 Claims, 14 Drawing Sheets

(51) Int. Cl.
*G02F 1/29* (2006.01)
*G02F 1/1337* (2006.01)
*G02B 27/22* (2006.01)

(52) U.S. Cl.
CPC ...................... *G02F 1/1337* (2013.01); *G02F 2001/134381* (2013.01); *G02F 2001/294* (2013.01)

(56) References Cited

U.S. PATENT DOCUMENTS

| | | | |
|---|---|---|---|
| 2003/0063186 A1 | 4/2003 | Tomono | |
| 2007/0296911 A1 | 12/2007 | Hong | |
| 2014/0036192 A1* | 2/2014 | Iyama | ............... G02F 1/134363 349/46 |

FOREIGN PATENT DOCUMENTS

| | | |
|---|---|---|
| KR | 1020110104701 | 9/2011 |
| KR | 1020130024783 | 3/2013 |
| KR | 1020130069415 | 6/2013 |
| KR | 101350971 | 1/2014 |

* cited by examiner

Amplitude modulation type of FrenelFresnel zone plate

OPTICAL MODULATION DEVICE AND A DRIVING METHOD THEREOF

CROSS-REFERENCE TO RELATED APPLICATION

This application claims priority under 35 U.S.C. §119 to Korean Patent Application No. 10-2015-0006146, filed on Jan. 13, 2015, in the Korean Intellectual Property Office, the disclosure of which is incorporated by reference herein in its entirety.

TECHNICAL FIELD

The present invention relates to an optical modulation device and a driving method thereof, and more particularly, to an optical modulation device including a liquid crystal, a method of driving the optical modulation device, and an optical apparatus using the optical modulation device.

DISCUSSION OF THE RELATED ART

An optical modulation device may be employed to modulate light in an optical display device. The optical modulation device may divide an image and transmit the same at different viewpoints, so a viewer can recognize the image as a three-dimensional (3D) image. The optical modulation device may include a lens or a prism that changes the image's light path. The light path may be controlled by phase modulation through diffraction.

SUMMARY

According to an exemplary embodiment of the present invention, an optical modulation device is provided. The optical modulation device includes a first plate, a second plate, and a liquid crystal layer. The first plate includes a first substrate, a lower plate electrode, a first electrode layer, and a first aligner. The lower plate electrode is formed on the first substrate. The first electrode layer and the first aligner are formed on the lower plate electrode. The second plate faces the first plate. The second plate includes an upper plate electrode and a second aligner. The liquid crystal layer is disposed between the first plate and the second plate. The liquid crystal layer includes a plurality of liquid crystal molecules. An alignment direction of the first aligner and an alignment direction of the second aligner are substantially parallel with each other.

The first electrode layer may include a first electrode array and an insulating layer. The first electrode array may include a plurality of first electrodes. The insulating layer may insulate the first electrode array from the lower plate electrode.

The plurality of first electrodes may not overlap each other.

The optical modulation device may include a first zone and a second zone. Each of the first and second zones may include a portion of the first plate, a portion of the second plate, and a portion of the liquid crystal layer. Voltages applied to a first plurality of first electrodes in the first zone may increase or decrease in a first direction in which the first plurality of first electrodes in the first zone is arranged.

A value of a voltage applied to the lower plate electrode may be equal to or less than a value of a voltage applied to the upper plate electrode. The value of the voltage applied to the upper plate electrode may be equal to or less than a minimum value of the voltages applied to the first plurality of first electrodes.

Each of the first and second zones may include a first sub-zone and a second sub-zone. Each of the first and second sub-zones may have a corresponding phase delay value.

Each of the first and second sub-zones may include at least one first electrode of the plurality of first electrodes.

Voltages applied to a second plurality of first electrodes of the first sub-zone of the first zone may be substantially the same as voltages applied to a third plurality of first electrodes in the first sub-zone of the second zone. The first sub-zone of the first zone may have substantially the same phase delay value as the first sub-zone of the second zone.

A width of each of the first plurality of first electrodes in the first zone may be larger than a width of each of the third plurality of first electrodes in the second zone.

A width of each of the first plurality of first electrodes in the first zone may be substantially the same as a width of each of the third plurality of first electrodes in the second zone.

A number of the first plurality of first electrodes in the first zone may be greater than a number of the third plurality of first electrodes in the second zone.

A width of each of the plurality of first electrodes may be equal to or larger than a gap between adjacent first electrodes of the plurality of first electrodes.

According to an exemplary embodiment of the present invention, a method of driving an optical modulation device is provided. The method includes applying a first voltage to an upper plate electrode in a second plate of the optical modulation device, applying a second voltage to a lower plate electrode in a first plate of the optical modulation device, and applying a corresponding third voltage to each of a plurality of first electrodes disposed on the lower plate electrode in the first plate. The first plate faces the second plate.

The optical modulation device may include the first plate, the second plate, and a liquid crystal layer. The first plate may include a first substrate, the lower plate electrode formed on the first substrate, a first electrode layer, and a first aligner. The first electrode layer and the first aligner may be formed on the lower plate electrode. The second plate may include the upper plate electrode and a second aligner. The liquid crystal layer may be disposed between the first plate and the second plate. The liquid crystal layer may include a plurality of liquid crystal molecules. An alignment direction of the first aligner and an alignment direction of the second aligner may be substantially parallel with each other.

The optical modulation device may include a first zone and a second zone. Each of the first and second zones may include a portion of the first plate, a portion of the second plate, and a portion of the liquid crystal layer. In the applying of the corresponding third voltage to each of the plurality of first electrodes, voltages applied to a first plurality of first electrodes in the first zone increase or decrease in a first direction in which the first plurality of first electrodes is arranged.

A value of a voltage applied to the lower plate electrode may be equal to or less than a value of a voltage applied to the upper plate electrode.

The value of the voltage applied to the upper plate electrode may be equal to or less than a minimum of voltages applied to the plurality of first electrodes.

According to an exemplary embodiment of the present invention, an optical modulation device is provided. The optical modulation device includes a first plate, a second plate, and a liquid crystal layer. The first plate includes a first substrate, a first electrode disposed on the first substrate, an insulating layer disposed between the first electrode and a plurality of second electrodes. The plurality of second electrodes is spaced apart from each other and is arranged in a first direction. The second plate faces the first plate. The second plate includes a second substrate. The liquid crystal layer is disposed between the first and second plates. The liquid crystal layer includes a plurality of liquid crystal molecules. The optical modulation includes a first zone and a second zone arranged in the first direction. Each of the first and second zones includes a portion of the first plate, a portion of the second plate, and a portion of the liquid crystal layer. A number of a first plurality of second electrodes in the first zone is greater than a number of a second plurality of second electrodes in the second zone.

A width of each of the first plurality of second electrodes in the first zone may be substantially the same as a width of each of the second plurality of second electrodes in the second zone.

A width of each of the plurality of second electrodes in the first zone may be substantially the same as a gap of adjacent second electrodes among the plurality of second electrodes in the first zone.

A width of each of the plurality of second electrodes may be equal to or larger than a cell gap of the liquid crystal layer.

DETAILED DESCRIPTION OF THE EMBODIMENTS

The present invention will be described more fully hereinafter with reference to the accompanying drawings, in which exemplary embodiments of the present invention are illustrated. However, the present invention may be embodied in various different forms and is not limited to the embodiments disclosed herein.

Figure 1:
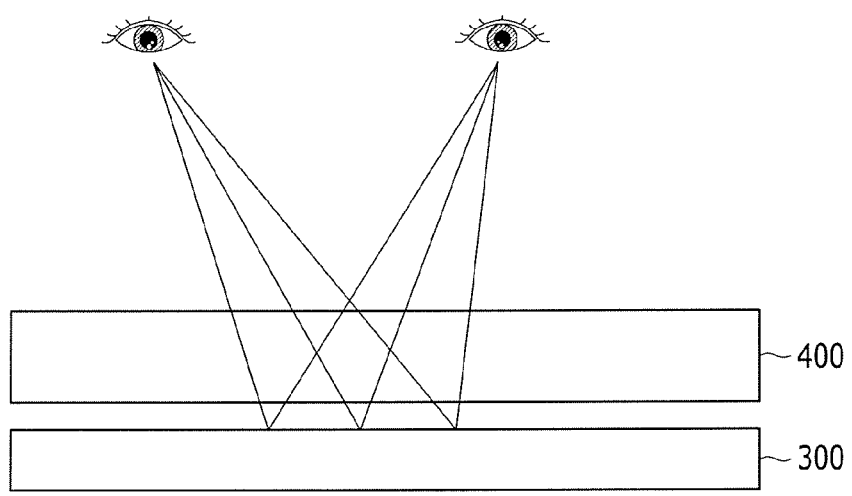
FIG. 1 is a view illustrating a structure of an image display device according to an exemplary embodiment and a method of forming a two-dimensional (2D) image.

In the drawings, the thicknesses of various layers and areas may be exaggerated for clarity. Like reference numerals may designate like elements throughout the specification and drawings. It will be understood that when an element such as a layer, film, region, or substrate is referred to as being "on" another element, it can be directly on the other element or intervening elements may also be present. FIG. 1 is a view illustrating a structure of an image display device according to an exemplary embodiment and a method of forming a two-dimensional (2D) image, and FIG. 2 is a view illustrating a structure of an image display device according to an exemplary embodiment and a method of forming a three-dimensional (3D) image.

Figure 2:
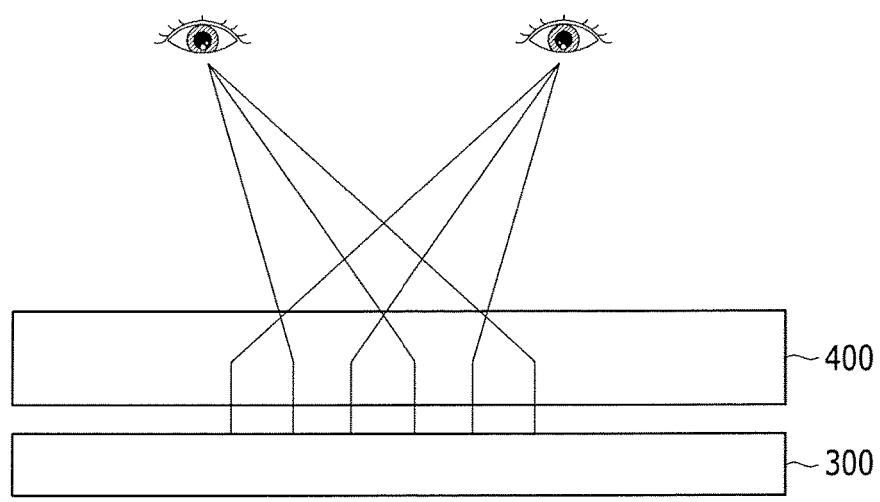
FIG. 2 is a view illustrating a structure of an image display device according to an exemplary embodiment and a method of forming a three-dimensional (3D) image.

Referring to FIGS. 1 and 2, an image display device according to an exemplary embodiment includes a display panel 300 that displays images and a liquid crystal lens 400 that is disposed ahead of an image display surface of the display panel 300.

The display panel 300 may be various flat displays such as a plasma display panel (PDP), a liquid crystal display, an organic light emitting display, or the like. The display panel 300 includes a plurality of pixels PX which is arranged in a matrix and used to make images. The display panel 300 displays a single plane image in a 2D mode and the display panel 300 can alternately display images (e.g., a right-eye image and a left-eye image) corresponding to visual ranges in a space-division scheme or a time-division scheme in a 3D mode. For example, in the 3D mode, the display panel 300 can alternately display a right-eye image and a left-eye image through the pixels in a single line.

The liquid crystal lens 400 may divide a visual range of an image displayed on the display panel 300 using diffraction of light and the liquid crystal lens 400 can be switched on/off. For example, the liquid crystal lens 400 refracts an image on the display panel 300 using diffraction of light, and thus, the image is formed in a desired visual range. The liquid crystal lens 400 may be turned off when the display panel 300 is in the 2D mode, and may be turned on when the display panel 300 is in the 3D mode, and thus, a visual range of an image of the display panel 300 may be divided. In an exemplary embodiment of the present invention, the liquid crystal lens 400 may be turned off when the display panel 300 is in the 3D mode, and may be turned on when the display panel 300 is in the 2D mode.

In the 2D mode, substantially the same image reaches a left eye and a right eye and thus, a 2D image is recognized, as shown in FIG. 1 where the liquid crystal lens 400 is turned off. An image of the display panel 300 is divided and refracted to visual ranges corresponding to the left eye and the right eye and thus, a 3D image is recognized, as shown in FIG. 2 where the liquid crystal lens 400 is turned on.

The liquid crystal lens 400 may be a Fresnel zone plate. The Fresnel zone plate functions as a lens that uses diffraction of light using a plurality of concentric circles which is arranged in a radial manner like a Fresnel zone. The plurality of concentric circles has smaller gaps therebetween as it goes toward the outside from the center of the Freznel zone plate.

Types of Fresnel zone plates according to optical characteristics will be described with reference to FIGS. 3 and 4.

Figure 3:
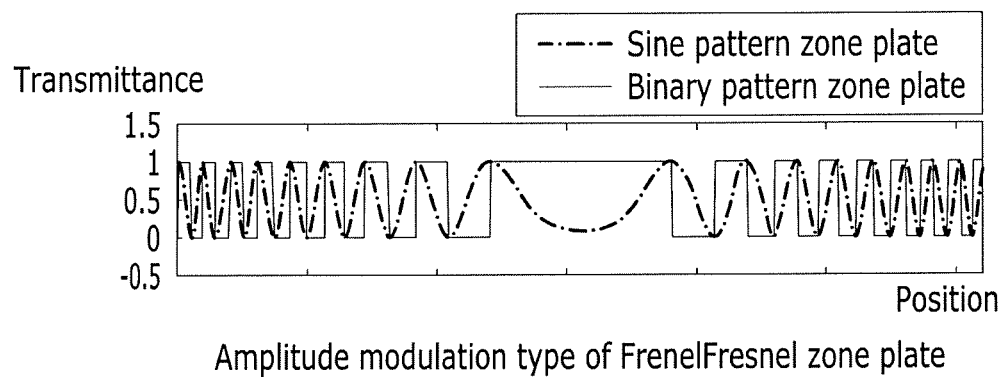
FIG. 3 is a graph illustrating changes in transmittance depending on a position of an amplitude modulation type of Fresnel zone plate.
Figure 4:
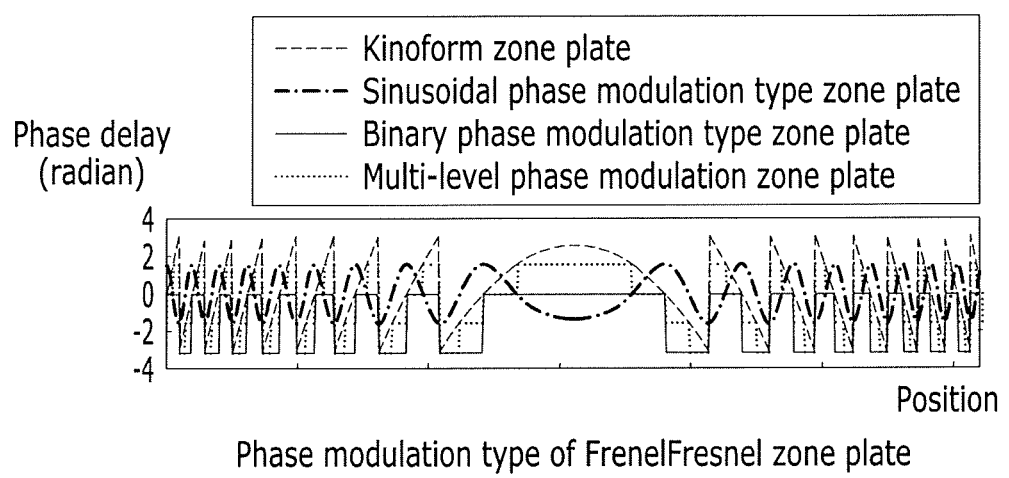
FIG. 4 is a graph illustrating phase delay changes depending on a position of a phase modulation type of Fresnel zone plate.

FIG. 3 is a graph illustrating changes in transmittance depending on a position of an amplitude modulation type of Fresnel zone plate, and FIG. 4 is a graph illustrating phase delay changes depending on a position of a phase modulation type of Fresnel zone plate. The Fresnel zone plate may include a plurality of zones which corresponds to regions to which repeated waveforms pertain in the graphs, respectively.

Referring to FIG. 3, the amplitude modulation type of Fresnel zone plate includes a sine pattern zone plate and a binary pattern zone plate. In the sine pattern zone plate, the light transmittance changes in a substantially sine curve between 0 and 1 as a function of a position of each zone. In the binary pattern zone plate, each zone is divided into two portions in which the light transmittances are 1 and 0.

Referring to FIG. 4, the phase modulation type of Fresnel zone plate includes a kinoform zone plate, a sinusoidal phase modulation zone plate, a binary phase modulation zone plate, and a multi-level phase modulation zone plate. The kinoform zone may have substantially the same phase delay as that of a Fresnel lens in each zone. In the sinusoidal phase modulation zone plate, a phase delay changes in a substantially sine curve in each zone. In the binary phase modulation zone plate, each zone is divided into two portions in which phase delays are 0 and $-\pi$ radians. In the multi-level phase modulation zone plate, a phase delay changes in a step-wise manner in each zone. Although FIG. 3 illustrates four steps of changes in the multi-level phase modulation zone plate, the present invention is not limited thereto.

If intensity of light at a focal distance of each zone plate is compared, diffraction efficiency of the phase modulation type of Fresnel zone plate is greater than that of the amplitude modulation type of Fresnel zone plate, and the multi-level phase modulation zone plate may have the highest diffraction efficiency, followed by the kinoform zone plate, to have the strongest intensity of light at the focal distance. Accordingly, the multi-level phase modulation zone plate will be described as an exemplary embodiment of the present invention, but the present invention is not limited thereto.

Hereinafter, a liquid crystal lens according to an exemplary embodiment will be described with reference to FIG. 5.

Figure 5:
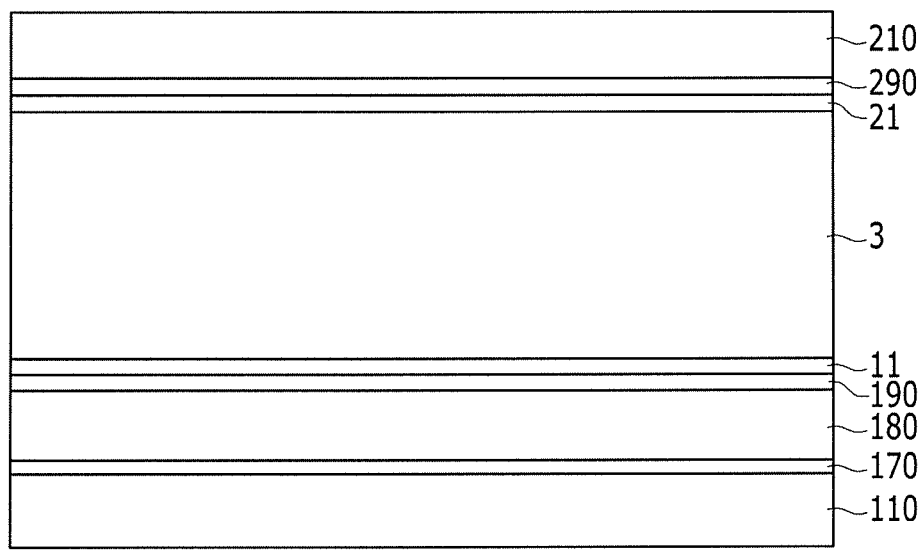
FIG. 5 is a cross-sectional view of a liquid crystal lens according to an exemplary embodiment of the present invention.

FIG. 5 is a cross-sectional view of a liquid crystal lens 401 according to an exemplary embodiment of the present invention.

A liquid crystal lens 401 according to an exemplary embodiment of the present invention, which is an example of the liquid crystal lens 400 described with reference to FIGS. 1 and 2, uses a liquid crystal. The liquid crystal lens 401 according to the present exemplary embodiment is made of an insulating material such as glass, plastic, or the like. The liquid crystal lens 401 may include a first plate 100, a second plate 200 and a liquid crystal layer disposed between the first plate and the second plate 100 and 200. The first plate 100 may include a first substrate 110, a first electrode layer 170, an insulating layer 180, a second electrode layer 190, and a first aligner 11. The second plate 200 may include a second substrate 210, a third electrode layer 290, and a second aligner 21. The first substrate 110 and the second substrate 210 face each other.

The first substrate 110 and the second substrate 210 may have rigidity or flexibility and may be flat or curved at least a portion thereof.

The first electrode layer 170, the second electrode layer 190, and the first alignment layer 11 are sequentially disposed over the first substrate 110. The third electrode layer 290 and the second alignment layer 21 are sequentially disposed over the second substrate 210.

Figure 6:
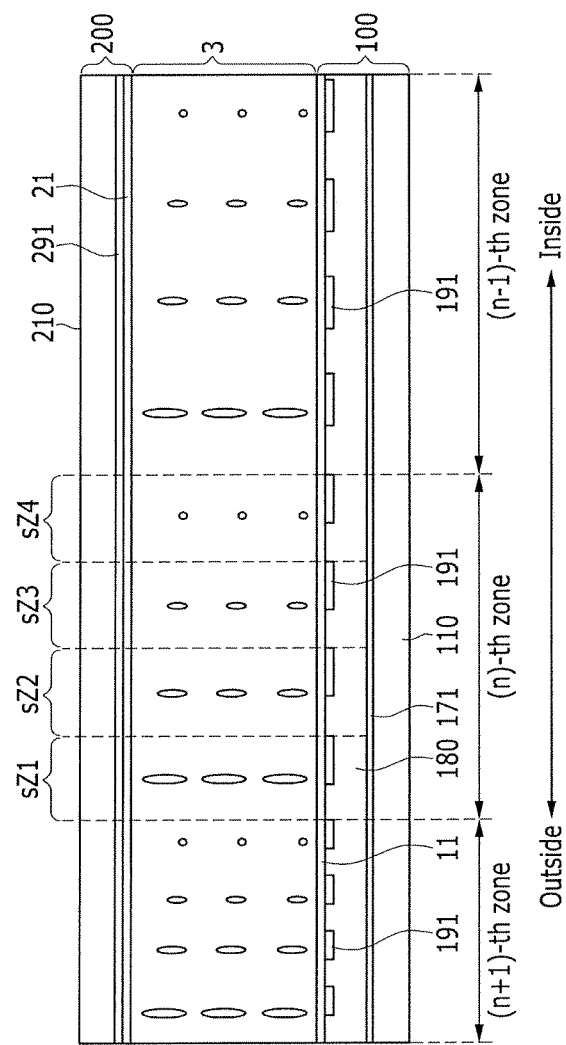
FIG. 6 is a cross-sectional view of a liquid crystal lens according to an exemplary embodiment of the present invention.

The first electrode layer 170 may include at least one first electrode 171 (see FIG. 6). The first electrode 171 may be formed in a whole body on the first substrate 110 or may include a plurality of patterned and spaced parts. The second electrode layer 190 includes a plurality of second electrodes 191 (see FIG. 6). The third electrode layer 290 may include a third electrode 291 (see FIG. 6). The third electrode 291 may be formed in a whole body on the second substrate 210 or may include a plurality of patterned and spaced parts.

The first through third electrodes 171, 191, and 291 included in the first electrode layer 170, the second electrode layer 190, and the third electrode 290, respectively, may be made of a transparent conductive material such as indium tin oxide (ITO), indium zinc oxide (IZO), or the like.

When a voltage is applied to the electrodes 171, 191, and 291 of the first electrode layer 170, the second electrode layer 190, and the third electrode layer 290, an electric filed is generated in the liquid crystal layer 3, and thus, an arrangement of the liquid crystal molecules in the liquid crystal layer 3 is controlled.

The alignment layers 11 and 21 determine an initial alignment of the liquid crystal molecules in the liquid crystal layer 3 and determine in advance an alignment direction of the liquid crystal molecules, and thus, the liquid crystal molecules can be rapidly aligned by an electric field generated in the liquid crystal layer 3.

The liquid crystal layer 3 may be aligned in various modes such as a horizontal alignment mode, a vertical alignment mode, an optical compensated bend (OCB) mode, or the like, and long axes of the liquid crystal molecules may not be twisted in a direction from the first substrate 110 to the second substrate 210 in the initial alignment mode.

In the OCB mode in which the liquid crystal lens 401 is turned off, liquid crystal molecules adjacent to the first substrate 110 and the second substrate 210 may be aligned substantially parallel to the first substrate 110 and the second substrate 210, and liquid crystal molecules far from the first substrate 110 and the second substrate 210 may be aligned substantially perpendicular to the first substrate 110 and the second substrate 210. When the liquid crystal lens 401 is turned on, the liquid crystal molecules may be aligned substantially perpendicular to the first substrate 110 and the second substrate 210. The liquid crystal layer 3 in the OCB mode can be achieved by forming horizontal alignment layers in substantially the same direction as each other on the first substrate 110 and the second substrate 210, respectively, and rubbing the horizontal alignment layers.

When a voltage is applied to the electrodes 171, 191, and 291 included in the first electrode layer 170, the second electrode layer 190, and the third electrode layer 290, an electric field is generated in the liquid crystal layer by the voltage applied to the electrodes. When an electric field is generated, the liquid crystal molecules in the liquid crystal layer 3 are appropriately arranged. On the basis of the arrangement of the liquid crystal molecules, the optical modulation device can function as a Fresnel zone plate and a lens by refracting light.

An exemplary embodiment of the liquid crystal lens will be described with reference to FIGS. 6 to 9 together with FIG. 5. Duplicate descriptions will be omitted.

Figure 7:
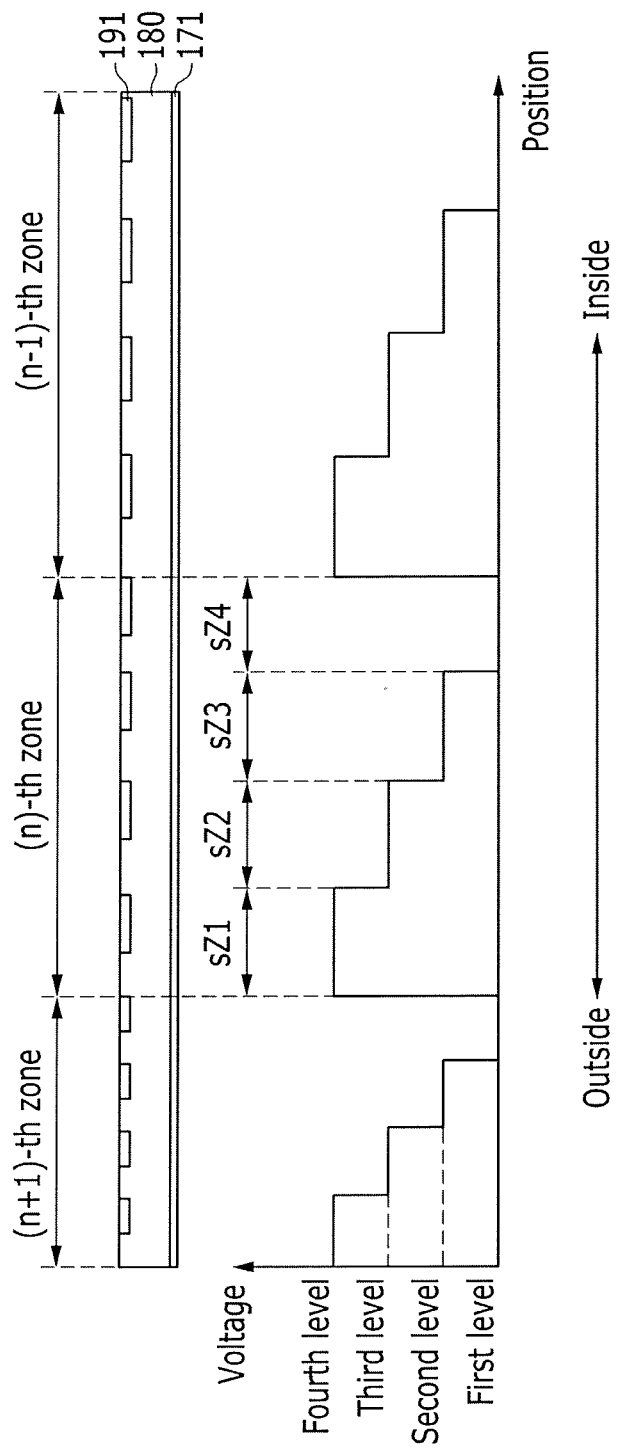
FIG. 7 is a view illustrating a voltage applied to an electrode of the liquid crystal lens of FIG. 6 according to an exemplary embodiment of the present invention.
Figure 8:
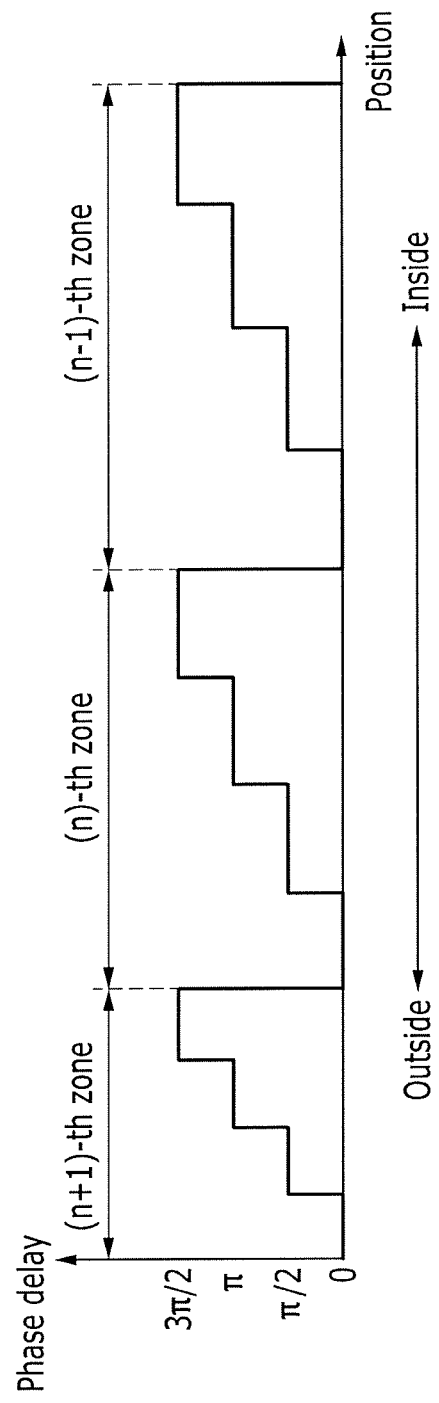
FIG. 8 is a view illustrating a phase delay in each zone of the liquid crystal lens of FIG. 6 according to an exemplary embodiment of the present invention.
Figure 9:
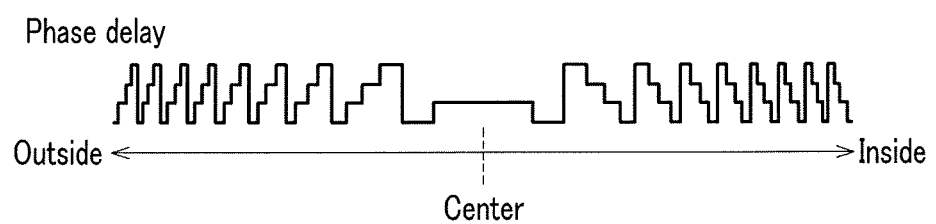
FIG. 9 is a view illustrating a phase delay in a period of the liquid crystal lens of FIG. 6 according to an exemplary embodiment of the present invention.

FIG. 6 is a cross-sectional view of a liquid crystal lens according to an exemplary embodiment of the present invention, FIG. 7 is a view illustrating a voltage applied to an electrode of the liquid crystal lens of FIG. 6 according to an exemplary embodiment of the present invention, FIG. 8 is a view illustrating a phase delay in each zone of the liquid crystal lens of FIG. 6 according to an exemplary embodiment of the present invention, and FIG. 9 is a view illustrating a phase delay in a period of the liquid crystal lens of FIG. 6 according to an exemplary embodiment of the present invention.

Referring to FIG. 6, the first electrode 171 included in the first electrode layer 170 may be formed in a whole body on the first substrate 110 and may include a plurality of patterned and spaced parts. The first electrode 171 receives a predetermined voltage such as a common voltage, or the like. The Fresnel zone plate may include a plurality of zones (e.g., (n−1)-th through (n+1)-th zones).

The second electrode layer 190 includes an insulating layer 180 disposed on the first electrode layer 171 and a second electrode array including the plurality of second electrodes 191 disposed on the insulating layer 180. Adjacent second electrodes 191 of the second electrode array may not overlap each other.

When a side where a center of the Fresnel zone plate is positioned is referred to as an inside, transverse widths of the second electrodes 191 or gaps between adjacent second electrodes 191 gradually decrease as they go toward the outside of the Fresnel zone plate.

In a direction from the inside to the outside of the Fresnel zone plate, an (n−1)-th zone, an n-th zone, and an (n+1)-th zone may be provided. Although FIG. 6 illustrates that four second electrodes 191 are disposed in each zone of the Fresnel zone plate, the present invention is not limited thereto. Each zone includes sub-zones sZ1, sZ2, sZ3, and sZ4 which each corresponds to, for example, each of the second electrodes 191. The sub-zones in each zone are indicated by sZ1, sZ2, sZ3, and sZ4 one after another in a direction from the outside to the inside.

Although each zone includes four sub-zones sZ1, sZ2, sZ3, and sZ4 in FIG. 6, the number of the sub-zones in each zone is not limited thereto. For example, the transverse widths of the second electrodes 191 may be uniform in each zone and the transverse gaps between adjacent second electrodes 191 in each zone may decrease as they go toward the outside from the inside.

In all the zones, the transverse widths of the second electrodes 191 may be larger than or the same as a cell gap of the liquid crystal layer 3. Accordingly, the cell cap of the liquid crystal layer 3 may be set to substantially 10 μm or less, or substantially 5 μm or less, and thus, the liquid crystal molecules may be easily controlled.

Further, in all the zones, the gaps between the adjacent second electrodes 191 may be smaller than or the same as the transverse widths of the second electrode 191.

The insulating layer 180 may be made of an inorganic insulating material or an organic insulating material and may electrically insulate the second electrode array from the first electrode 171.

The third electrode 291 may be formed on the second substrate 210 and receive a predetermined voltage such as a common voltage, or the like. The third electrode 291 may be formed in a whole body or may include a plurality of patterned and spaced parts.

Alignment layers 11 and 21 may be rubbed in a longitudinal direction which is substantially perpendicular to a width direction of the second electrodes 191 or in a direction at a predetermined angle from the width direction. For example, the longitudinal direction may be perpendicular to the surface of the figure. The rubbing directions of the alignment layer 11 and the alignment layer 21 may be substantially the same as each other.

Although liquid crystal molecules in the liquid crystal layer 3 may be aligned in a horizontal direction with respect to the surfaces of the substrates 110 and 210 in an initial stage, an alignment mode of the liquid crystal layer 3 is not limited thereto, and the liquid crystal molecules may be aligned in a vertical direction with respect to the surfaces of the substrates 110 and 210 in the initial stage.

Hereinafter, operation of the liquid crystal lens 401 will be described with reference to FIGS. 6 and 7.

Referring to FIGS. 6 and 7, the second electrodes 191 in each zone receives a voltage of which a level increases or decreases in a direction from the inside to the outside. For example, a second electrode 191 in the sub-zone sZ4 may receive a first level of voltage, a second electrode 191 in the sub-zone sZ3 may receive a second level of voltage higher than the first level, a second electrode 191 in the sub-zone sZ2 may receive a third level of voltage higher than the second level, and a second electrode 191 in the sub-zone sZ1 may receive a fourth level of voltage higher than the third level. In each zone, the second electrodes 191 in the same sub-zone receive a voltage such that they make substantially the same phase delay as each other.

A voltage below the first level may be applied to the first electrode 171 and the third electrode 291. The level of the voltage applied to the first electrode 171 may be different from that applied to the third electrode 291. For example, the voltage applied to the third electrode 291 may be higher than the voltage applied to the first electrode 171. In an exemplary embodiment of the present invention, substantially the same level of voltage may be applied to the first electrode 171 and the third electrode 291.

When corresponding voltages are applied to the first electrode 171, the second electrode 191, and the third electrode 291, respectively, the liquid crystal molecules in the liquid crystal layer 3 may be arranged, as illustrated in FIG. 6.

When the liquid crystal layer 3 is horizontally aligned, the liquid crystal molecules in the sub-zone sZ4 is kept horizontally aligned to the substrates 110 and 210. The liquid crystal molecules of the liquid crystal layer 3 are aligned more perpendicular to the substrates 110 and 210 as they go in a direction from the sub-zone sZ3 to the sub-zone sZ1.

Due to the changes in arrangement of the liquid crystal molecules of the liquid crystal layer 3 depending on the sub-zones sZ1, sZ2, sZ3, and sZ4, phase delay values by the liquid crystal layer 3 may be different from each other depending on the sub-zones sZ1, sZ2, sZ3, and sZ4, as illustrated in FIG. 8.

For example, when phase delay values in each zone of a Fresnel zone plate gradually increase in a step curve toward the inside, the multi-level phase modulation zone plate described above can be achieved.

It is described that a phase delay value formed by the liquid crystal layer 3 decreases when a voltage applied to the second electrode 191 increases. However, in an exemplary embodiment of the present invention, the liquid crystal layer 3 may be designed such that the phase delay value formed by the liquid crystal layer 3 increases when the voltage applied to the second electrode 191 increases.

As described above, by adjusting the voltages applied to the first electrode 171, the second electrode 191, and the third electrode 291 such that the phase delay values of the liquid crystal layer 3 in each zone changes in multi levels, a phase modulation type of Fresnel zone plate may be achieved.

Further, light passing through each zone of the phase modulation type of Fresnel zone plate may be refracted by diffraction, destructive interference, and/or constructive interference so that the light is concentrated on a focal point. FIG. 9 illustrates a phase modulation type of Fresnel zone plate using a liquid crystal lens according to an exemplary embodiment of the present invention.

When substantially the same voltage is applied to the first electrode 171, the second electrode 191, and the third electrode 291, the liquid crystal lens 3 may not function as a liquid crystal lens, and thus, a viewer can recognize a 2D image on the display panel 300.

As described above, according to the present exemplary embodiment, a cell gap of a liquid crystal layer including a liquid crystal lens can be formed to be small and thus, liquid crystal molecules can be easily controlled, and since the surfaces of the first substrate 110 and the second substrate 210 contacting the liquid crystal layer 3 are substantially flat, the liquid crystal layer 3 can be more uniformly aligned.

Further, using the Fresnel zone plate principle, a thickness of a liquid crystal lens can be reduced and thus, a cell gap of a liquid crystal layer can be further reduced. Accordingly, productivity of liquid crystal lenses for image display devices may be increased.

Further, according to the present exemplary embodiment, the ability of controlling liquid crystal molecules may be increased by the voltage applied to the first electrode 191, and thus, texture can be suppressed and a transmission speed of an optical modulation device can be increased.

Next, a liquid crystal lens according to an exemplary embodiment of the present invention will be described with reference to FIGS. 5 to 9 described above, together with FIG. 10. Duplicate descriptions will be omitted.

Figure 10:
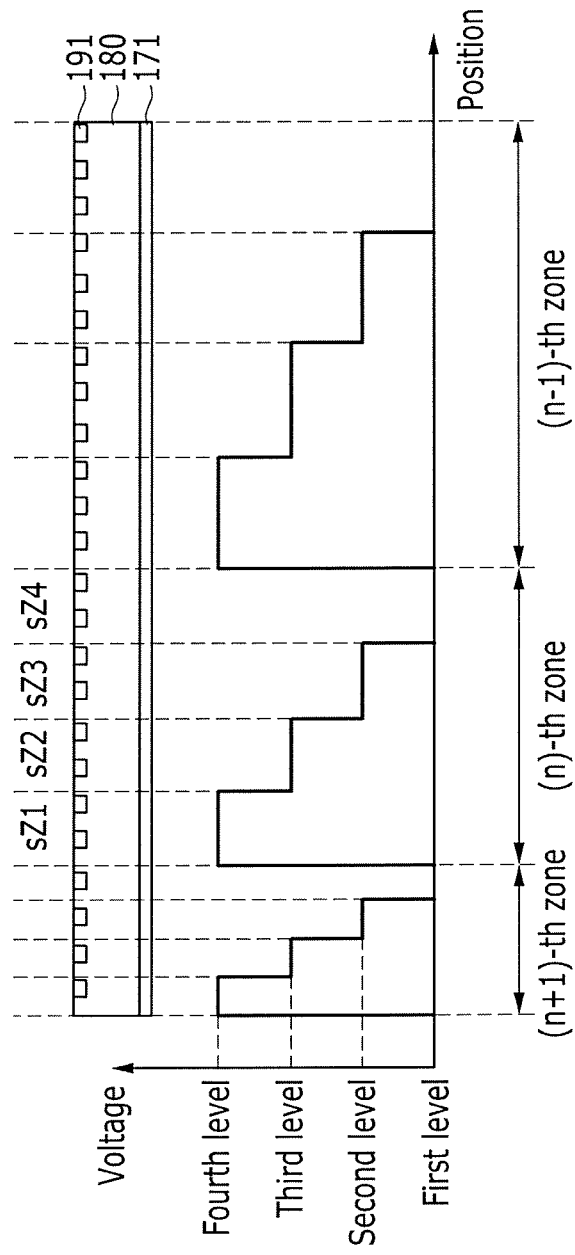
FIG. 10 is a cross-sectional view of a liquid crystal lens which illustrates a voltage applied to an electrode of the liquid crystal lens according to an exemplary embodiment of the present invention.

FIG. 10 is a cross-sectional view of a liquid crystal lens which illustrates a voltage applied to an electrode of the liquid crystal lens according to an exemplary embodiment of the present invention.

The liquid crystal lens according to the present exemplary embodiment is similar to the liquid crystal lens illustrated in FIGS. 5 and 6, but is different from that illustrated in FIGS. 5 and 6 in a structure of the second electrode layer 190.

The second electrode layer 190 includes an insulating layer 180 disposed on a first electrode layer 171 and a second electrode array including a plurality of second electrodes 191 disposed on the insulating layer 180. Adjacent second electrodes 191 of the second electrode array may not overlap each other.

Transverse widths of the second electrodes 191 or gaps between adjacent second electrodes 191 are uniform regardless of positions of zones or sub-zones sZ1, sZ2, sZ3, and sZ4. The transverse widths of the second electrodes 191 may be substantially the same as the gaps of adjacent second electrodes 191. Further, the transverse widths of the second electrodes 191 may be larger than or the same as the cell gap of the liquid crystal layer 3.

In the present exemplary embodiment, the numbers of the second electrodes 191 in each zone or each of the sub-zones sZ1, sZ2, sZ3, and sZ4 of a zone plate depend on positions of the zones.

Referring to FIG. 10, each of the sub-zones sZ1, sZ2, sZ3, and sZ4 includes a single second electrode 191 in the (n+1)-th zone, for example, four second electrodes 191 are in the (n+1)-th zone.

In the n-th zone, each of the sub-zones sZ1, sZ2, sZ3, and sZ4 includes two second electrodes 191, for example, eight second electrodes 191 are in the n-th zone.

In the (n−1)-th zone, each of the sub-zones sZ1, sZ2, sZ3, and sZ4 includes three second electrodes 191, for example, twelve second electrodes 191 are in the n−1-th zone.

Each of the sub-zones sZ1, sZ2, sZ3, and sZ4 includes at least one second electrode 191. The number of the second electrodes 191 in each of the zones decreases as it goes from the inside to the outside. However, the numbers of the second electrodes 191 included in some adjacent zones may be the same as each other.

In the present exemplary embodiment, to implement a Fresnel zone plate, at least one second electrode 191 in the same sub-zone sZ1, sZ2, sZ3, or sZ4 for each of the zones receives a voltage such that phase delay values in the corresponding same sub-zone sZ1, sZ2, sZ3, or sZ4 are substantially the same as each other.

For example, a second electrode 191 in a first sub-zone (e.g., the sub-zone sZ1) of the (n+1)-th zone, second electrodes 191 in the first sub-zone of the n-th zone, and second electrodes in the first sub-zone of the (n−1)-th zone may receive substantially the same voltage such that phase delay values in the respective first sub-zones of the (n−1)-th through (n+1)-th zones are substantially the same as each other.

Further, the second electrodes 191 in the sub-zones sZ1 and sZ2 at the outer side for each of the zones may receive voltages higher than voltages of the second electrodes 191 in the sub-zones sZ3 and sZ4 at the inner side for each of the zones.

According to the present exemplary embodiment, unlike the exemplary embodiment illustrated in FIG. 6, the first electrodes 191 can be arranged with regular widths and intervals, and thus, a position of a Fresnel zone plate in a liquid crystal lens or positions and widths of the zones of the Fresnel zone plate may be adjusted.

Accordingly, for an image display device, the position of the Fresnel zone plate of the liquid crystal lens may be moved, and thus, a time-division driving may be achieved. Therefore, a recognizable area in one visual range of one frame can be increased, and thus, resolution of the image display device can be increased.

In addition, the various characteristics and effects (e.g., the phase delay values changing depending on positions of zones of the Fresnel zone plate, the phase delay values changing in a step curve in each sub-zone, the increased transmission speed due to the suppressed texture) of an optical modulation device according to the exemplary embodiment described above with reference to FIGS. 5 to 9 can be achieved in an optical modulation device according to the present exemplary embodiment.

Next, an image display device according to an exemplary embodiment is described with reference to FIG. 11.

Figure 11:
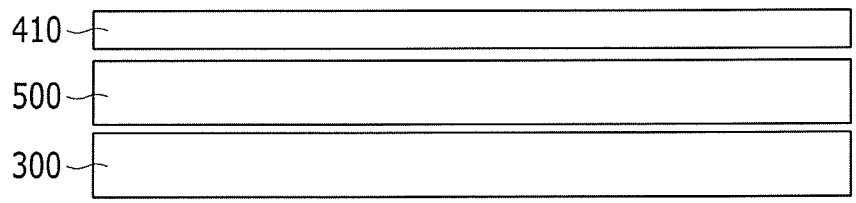
FIG. 11 is a cross-sectional view of a polarization conversion type of image display device according to an exemplary embodiment of the present invention.

FIG. 11 is a cross-sectional view of a polarization conversion type of image display device according to an exemplary embodiment of the present invention.

An image display device according to an exemplary embodiment includes a display panel 300 that displays images, a polarization switching unit 500, and an anisotropic liquid crystal lens 410 that are disposed ahead of the image display surface of the display panel 300.

The display panel 300 is substantially the same as that described with reference to FIGS. 1 and 2, and thus, detailed description will be omitted.

The anisotropic liquid crystal lens 410, a liquid crystal lens such as the Fresnel zone plate described above, has an optical anisotropy, and thus, the function of a Fresnel zone plate is selectively switched on/off by the polarization switching unit 500 in accordance with a polarization state of incident light. When the anisotropic liquid crystal lens 410 functions as a Fresnel zone plate, the display panel 300 displays images in a 3D mode and the anisotropic liquid crystal lens 410 divides the visual range of the displayed image, and thus, a viewer can recognize the images as the 3D mode. When the anisotropic liquid crystal lens 410 does not function as the Fresnel zone plate, the display panel 300 displays images in the 2D mode, and thus, a viewer can recognize the images as the 2D mode.

The polarization switching unit 500 may be switched to function as a Fresnel zone plate by adjusting a polarization direction of an image from the display panel 300 so that a phase delay is generated in the anisotropic liquid crystal lens 410, or the polarization switching unit 500 may not function as the Fresnel zone plate by preventing the anisotropic liquid crystal lens 410 from generating the phase delay.

An exemplary embodiment of the anisotropic liquid crystal lens 410 is now described with reference to FIG. 12.

Figure 12:
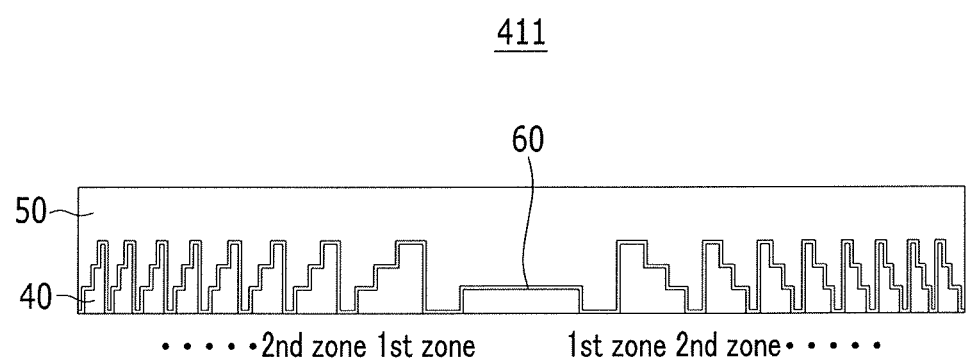
FIG. 12 is a cross-sectional view of a film type of anisotropic liquid crystal lens included in the polarization conversion type of image display device of FIG. 11 according to an exemplary embodiment of the present invention.

FIG. 12 is a cross-sectional view of a film type of anisotropic liquid crystal lens included in the polarization conversion type of image display device of FIG. 11 according to an exemplary embodiment of the present invention.

Referring to FIG. 12, an anisotropic liquid crystal lens 411 according to an exemplary embodiment of the present invention includes an isotropic diffraction film 50, an alignment layer 60 applied to a side of the isotropic diffraction film 50, and an anisotropic material layer 40 disposed on the alignment layer 60.

The isotropic diffraction film 50 may be made of an optical isotropic organic material, an inorganic material, or the like. A cross-section of the isotropic diffraction film 50, which is taken with respect to the alignment layer 60, has a shape substantially the same as the phase delay of the multi-level phase modulation zone plate described above. Accordingly, the anisotropic liquid crystal lens 411 has a phase delay substantially the same as the phase delay of the multi-level phase modulation zone plate. In an exemplary embodiment of the present invention, the cross-section of the isotropic diffraction film 50 may have a phase delay substantially the same as those of the various Fresnel zone plates described above with reference to FIG. 4.

The anisotropic material layer 40 may be made of an optical anisotropic material such as a liquid crystal polymer, or the like, and may be a material cured by ultraviolet rays. When the anisotropic material layer 40 is made of a liquid crystal polymer, the alignment layer 60 determines an alignment of a liquid crystal material in a process of forming the anisotropic material layer 40, and the alignment of the liquid crystal material may not be provided when an anisotropic material that does not need to be aligned is used. When the anisotropic material layer 40 is made of a liquid crystal polymer, another alignment layer may be further formed on the anisotropic material layer 40.

Next, an exemplary embodiment of the anisotropic liquid crystal lens 410 illustrated in FIG. 11 is described with reference to FIG. 13.

Figure 13:
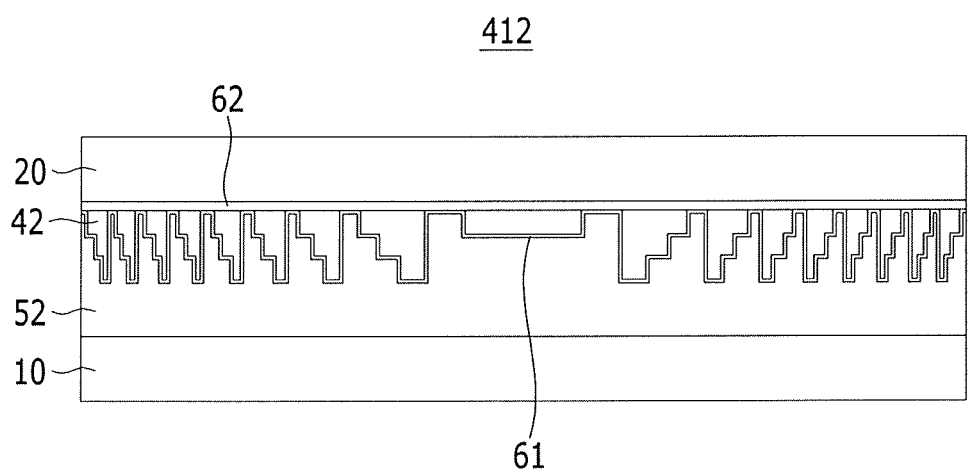
FIG. 13 is a cross-sectional view of a liquid crystal cell type of anisotropic liquid crystal lens included in the polarization conversion type of image display device of FIG. 11 according to an exemplary embodiment of the present invention.

FIG. 13 is a cross-sectional view of a liquid crystal cell type of anisotropic liquid crystal lens included in the polarization conversion type of image display device of FIG. 11 according to an exemplary embodiment of the present invention.

Referring to FIG. 13, an anisotropic liquid crystal lens 421 according to the present exemplary embodiment includes a first substrate 10 and a second substrate 20 which face each other, an isotropic diffraction layer 52 disposed between the first and second substrates 10 and 20, an alignment layer 61 applied to a side of the isotropic diffraction layer 52, a liquid crystal layer 42 disposed on the alignment layer 61, and an alignment layer 62 applied between the liquid crystal layer 42 and the second substrate 20.

A shape of a top of the isotropic diffraction layer 52 changes in multi levels like the phase delay of the multi-level phase modulation zone plate described above and a height of the isotropic diffraction layer 52 decreases in a region corresponding to each zone of the zone plate as it goes toward the center of the zone plate. Accordingly, the anisotropic liquid crystal lens 412 has a phase delay substantially the same as the phase delay of the multi-level phase modulation zone plate. In an exemplary embodiment of the present invention, a shape of the top of the isotropic diffraction film 52 may have a phase delay substantially the same as those of the various Fresnel zone plates described above with reference to FIG. 4.

The liquid crystal layer 42 is aligned in a direction determined by the alignment layers 61 and 62. Liquid crystal molecules in the liquid crystal layer 42 have a shape of bar with a long axis and a short axis and have anisotropy in which optical characteristics of the liquid crystal molecules are different from each other in directions of the long and short axes. For example, the liquid crystal molecules have different optical characteristics such as permittivity, a refractive index, conductivity, viscosity, or the like, in a direction substantially parallel with the long axis and a direction substantially perpendicular to the long axis. Since the liquid crystal layer 3 includes the liquid crystal molecules, the anisotropic liquid crystal lens 412 can have optical anisotropy.

Accordingly, the anisotropic liquid crystal lens 412 according to the present exemplary embodiment may function as a Fresnel zone plate, depending on a polarization direction of incident light adjusted by the polarization switching unit 500 of FIG. 11 described above to provide 3D images, or the anisotropic liquid crystal lens 412 may not function as the Fresnel zone plate to provide 2D images.

Hereinafter, a method of manufacturing the anisotropic liquid crystal lens 412 will be described. The isotropic diffraction layer 52 may be formed by stacking an optically isotropic organic material or inorganic material on the first substrate 10 made of an insulating material and patterning a top of the organic or inorganic material. The alignment layer 61 is applied to the patterned isotropic diffraction layer 52, the second substrate 20 to which the alignment layer 62 is applied is combined with the first substrate 10, and the liquid crystal layer 3 is injected between the first and second substrates 10 and 20, and thus, the anisotropic liquid crystal lens 412 is formed.

As described above with reference to FIGS. 11 to 13, the anisotropic liquid crystal lens 412 is turned on/off by a polarization adjustment of the polarization switching unit 500, and thus, conversion between 2D images and 3D images can be easily achieved, a thin anisotropic liquid crystal lens can be achieved, and productivity of liquid crystal lenses can be increased.

In addition, a method of driving an image display device including the liquid crystal lens 400 and the display panel 300 according to an exemplary embodiment of the present invention described above will be described with reference to FIGS. 1, 2, and 14.

Figure 14:
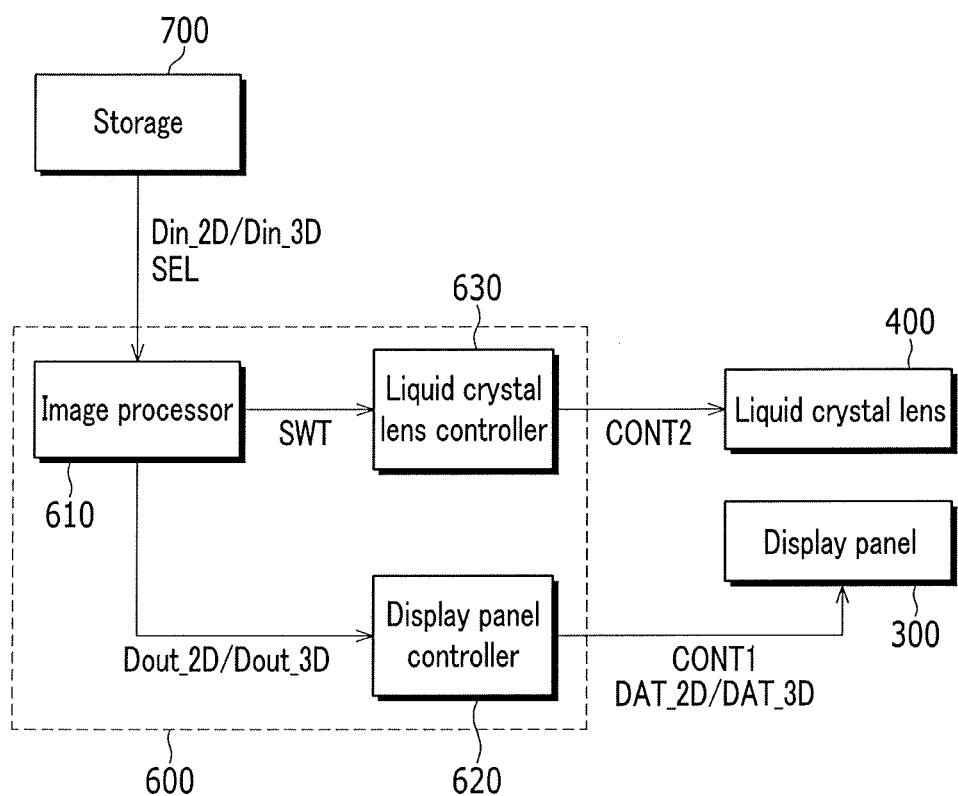
FIG. 14 is a block diagram illustrating a method of driving an image display device according to an exemplary embodiment of the present invention.

FIG. 14 is a block diagram illustrating a method of driving an image display device according to an exemplary embodiment of the present invention.

A storage 700 positioned outside the image display device can keep 2D image information and 3D image information and can receive selection information from an outside. The selection information may determine which one of a 2D image and a 3D image to be displayed. The storage 700 that receives the selection information outputs a 2D image signal Din_2D or a 3D image signal Din_3D to a control unit 600 of the image display device in response to the selection information. The storage 700 further outputs a selection signal SEL to the control unit 600 in response to the selection information. The storage 700 may output a single kind of image signal, and thus, the selection signal SEL may not be output from the storage 700.

The control unit 600 may include an image processor 610, a display panel controller 620, and a liquid crystal lens controller 630. The image processor 610 of the control unit 600 receives the 2D image signal Din_2D or the 3D image signal Din_3D, and the selection signal SEL, processes the 2D or 3D image signal Din_2D or Din_3D, and outputs the processed 2D image signal Dout_2D or the processed 3D image signal Dout_3D to the display panel controller 620. The control unit 600 further outputs a switching signal Swt to the liquid crystal lens controller 630. The switching signal Swt corresponds to a signal for turning on/off the liquid crystal lens 400.

The liquid crystal lens controller 630 receiving the switching signal Swt generates a liquid crystal lens control signal CONT2 and outputs the generated liquid crystal lens control signal CONT2 to a liquid crystal lens 400 of the image display device. The liquid crystal lens control signal CONT2 controls turning on/off the liquid crystal lens 400.

The display panel controller 620 receiving the processed 2D image signal Dout_2D or the processed 3D image signal Dout_3D generates 2D image data DAT_2D or 3D image data DAT_3D, and a display panel control signal CONT1, and outputs the 2D image data DAT_2D or the 3D image data DAT_3D, and the display panel control signal CONT1 to the display panel 300. The display panel control signal CONT1 controls whether the display panel 300 operates in a 2D mode or a 3D mode.

For example, the display panel 300 operates in the 2D mode or the 3D mode in accordance with the display panel control signal CONT1. When the display panel 300 operates in the 2D mode, the display panel 300 displays the 2D image data DAT_2D, and when the display panel 300 operates in the 3D mode, the display panel 300 displays the 3D data DAT_3D.

The liquid crystal lens 400 is switched on/off in accordance with the liquid crystal lens control signal CONT2. The liquid crystal lens 400 may be turned off when the display panel 300 operates in the 2D mode, and the liquid crystal lens 400 may be turned on when the display panel 300 operates in the 3D mode. In an exemplary embodiment of the present invention, the liquid crystal lens 400 may be turned on when the display panel 300 operates in the 2D mode, and the liquid crystal lens 400 may be turned off when the display panel 300 operates in the 3D mode. This operation described above may depend on a kind of the liquid crystal lens 400.

An optical modulation device according to an exemplary embodiment of the present invention may suppress texture due to stably arranged liquid crystal molecules.

Further, an optical modulation device according to an exemplary embodiment of the present invention can be increased in size and can function as a lens, a diffraction grating, a prism, or the like, and thus, it can be used for various optical devices such as a 3D image display device, or the like.

Further, an optical modulation device according to an exemplary embodiment of the present invention may have liquid crystal molecules rapidly arranged.

While the present invention has been particularly shown and described with reference to exemplary embodiments thereof, it will be understood that the present invention is not limited to the disclosed embodiments, but may cover various modifications and equivalent arrangements included within the spirit and scope of the appended claims.

What is claimed is:

1. An optical modulation device comprising:
a first plate including a first substrate, a lower plate electrode, a first electrode layer, which includes a first electrode array including a plurality of first electrodes, and a first aligner, wherein the lower plate electrode is formed on the first substrate, and the first electrode layer and the first aligner are formed on the lower plate electrode;
a second plate facing the first plate, the second plate includes an upper plate electrode and a second aligner; and
a liquid crystal layer disposed between the first plate and the second plate, the liquid crystal layer including a plurality of liquid crystal molecules,
wherein an alignment direction of the first aligner and an alignment direction of the second aligner are substantially parallel with each other, wherein the optical modulation device further comprises:
a first zone, wherein voltages applied to a first plurality of first electrodes in the first zone increase or decrease in a first direction in which the plurality of first electrodes is arranged in the first zone.

2. The optical modulation device of claim 1, wherein:
the first electrode layer includes:
an insulating layer insulating the first electrode array from the lower plate electrode.

3. The optical modulation device of claim 2, wherein:
the first electrodes do not overlap each other.

4. The optical modulation device of claim 3, further comprising a second zone,
wherein each of the first and second zones includes a portion of the first plate, a portion of the second plate, and a portion of the liquid crystal layer.

5. The optical modulation device of claim 4, wherein:
a value of a voltage applied to the lower plate electrode is equal to or less than a value of a voltage applied to the upper plate electrode, and
wherein the value of the voltage applied to the upper plate electrode is equal to or less than a minimum value of the voltages applied to the first plurality of first electrodes.

6. The optical modulation device of claim 5, wherein:
each of the first and second zones includes a first sub-zone and a second sub-zone, and each of the first and second sub-zones has a corresponding phase delay value.

7. The optical modulation device of claim 6, wherein:
each of the first and second sub-zones includes at least one first electrode among the plurality of first electrodes.

8. The optical modulation device of claim 7, wherein:
voltages applied to a second plurality of first electrodes of the first sub-zone of the first zone is substantially the same as voltages applied to a third plurality of first electrodes in the first sub-zone of the second zone, and
wherein the first sub-zone of the first zone has substantially the same phase delay value as the first sub-zone of the second zone.

9. The optical modulation device of claim 8, wherein:
a width of each of the first plurality of first electrodes in the first zone is larger than a width of each of a third plurality of first electrodes in the second zone.

10. The optical modulation device of claim 8, wherein:
a width of each of the first plurality of first electrodes in the first zone is substantially the same as a width of each of the third plurality of first electrodes in the second zone.

11. The optical modulation device of claim 10, wherein:
a number of the first plurality of first electrodes in the first zone is greater than a number of the third plurality of first electrodes in the second zone.

12. The optical modulation device of claim 2, wherein:
a width of each of the plurality of first electrodes is equal to or larger than a gap between adjacent first electrodes of the plurality of first electrodes.

13. A method of driving an optical modulation device, the method comprising:
applying a first voltage to an upper plate electrode in a second plate of the optical modulation device;
applying a second voltage to a lower plate electrode in a first plate of the optical modulation device, the first plate facing the second plate; and
applying a corresponding third voltage to each of a plurality of first electrodes disposed on the lower plate electrode in the first plate,
wherein the optical modulation device includes a first zone, wherein in the applying of the corresponding third voltage to each of the plurality of first electrodes, voltages applied to a first plurality of first electrodes in the first zone increase or decrease in a first direction in which the first plurality of first electrodes is arranged in the first zone.

14. The method of claim 13, wherein:
the optical modulation device includes:
the first plate including a first substrate, the lower plate electrode, a first electrode layer, and a first aligner, wherein the lower plate electrode is formed on the first substrate, and the first electrode layer and the first aligner are formed on the lower plate electrode;
the second plate including the upper plate electrode and a second aligner; and
a liquid crystal layer disposed between the first plate and the second plate, the liquid crystal layer including a plurality of liquid crystal molecules,
wherein an alignment direction of the first aligner and an alignment direction of the second aligner are substantially parallel with each other.

15. The method of claim 14, wherein:
the optical modulation device includes a second zone, wherein each of the first and second zones includes a portion of the first plate, a portion of the second plate, and a portion of the liquid crystal layer.

16. The method of claim 13, wherein:
a value of a voltage applied to the lower plate electrode is equal to or less than a value of a voltage applied to the upper plate electrode.

17. The method of claim 16, wherein:
the value of the voltage applied to the upper plate electrode is equal to or less than a minimum value of voltages applied to the plurality of first electrodes.

18. An optical modulation device comprising:
a first plate including a first substrate, a first electrode disposed on the first substrate, an insulating layer disposed between the first electrode and a plurality of second electrodes, wherein the plurality of second electrodes are spaced apart from each other and arranged in a first direction;
a second plate facing the first plate, the second plate including a second substrate; and
a liquid crystal layer disposed between the first and second plates, the liquid crystal layer including a plurality of liquid crystal molecules,
wherein the optical modulation device includes a first zone and a second zone arranged in the first direction,
wherein each of the first and second zones includes a portion of the first plate, a portion of the second plate, and a portion of the liquid crystal layer,
wherein a number of a first plurality of second electrodes in the first zone is greater than a number of a second plurality of second electrodes in the second zone, and
wherein a width of each of the plurality of second electrodes in the first zone is substantially the same as a gap of adjacent second electrodes among the plurality of second electrodes in the first zone.

19. An optical modulation device comprising:
a first plate including a first substrate, a first electrode disposed on the first substrate, an insulating layer disposed between the first electrode and a plurality of second electrodes, wherein the plurality of second electrodes are spaced apart from each other and arranged in a first direction;
a second plate facing the first plate, the second plate including a second substrate; and
a liquid crystal layer disposed between the first and second plates, the liquid crystal layer including a plurality of liquid crystal molecules,
wherein the optical modulation device includes a first zone and a second zone arranged in the first direction,
wherein each of the first and second zones includes a portion of the first plate, a portion of the second plate, and a portion of the liquid crystal layer,
wherein a number of a first plurality of second electrodes in the first zone is greater than a number of a second plurality of second electrodes in the second zone, and
wherein a width of each of the plurality of second electrodes is equal to or larger than a cell gap of the liquid crystal layer.

* * * * *